(12) United States Patent
Keijzer (10) Patent No.: US 10,494,201 B2
(45) Date of Patent: Dec. 3, 2019

(54) METHOD OF PROVIDING A PLANT TRAY WITH NESTABLE CONES, AS WELL AS A DEVICE THEREFOR

(71) Applicant: Maan Intellectual Properties B.V., Raalte (NL)

(72) Inventor: Edward Keijzer, Maasland (NL)

(73) Assignee: Maan Intellectual Properties B.V., Raalte (NL)

( * ) Notice: Subject to any disclaimer, the term of this patent is extended or adjusted under 35 U.S.C. 154(b) by 0 days.

(21) Appl. No.: 15/629,067

(22) Filed: Jun. 21, 2017

(65) Prior Publication Data

US 2018/0370740 A1 Dec. 27, 2018

(51) Int. Cl.
*B65G 59/10* (2006.01)

(52) U.S. Cl.
CPC .................................. *B65G 59/103* (2013.01)

(58) Field of Classification Search
CPC ......... B65B 39/06; B65B 39/08; B65B 39/10; B65B 43/14; B65G 11/023; B65G 47/36; B65G 47/44; B65G 47/901; B65G 59/005; B65G 59/10; B65G 59/103; B65G 59/105; B65G 59/106

See application file for complete search history.

(56) References Cited

U.S. PATENT DOCUMENTS

| | | | | | |
|---|---|---|---|---|---|
| 2,059,546 | A | * | 11/1936 | Brandenburg | B65B 43/44 221/220 |
| 3,323,680 | A | * | 6/1967 | Beer | B65G 59/106 221/221 |
| 3,985,265 | A | * | 10/1976 | Sauer | B65G 59/106 221/221 |
| 4,919,587 | A | * | 4/1990 | Tashiro | B65G 59/103 221/209 |
| 4,967,930 | A | | 11/1990 | Koltze | |
| 2010/0104413 | A1 | | 4/2010 | Irwin | |

FOREIGN PATENT DOCUMENTS

| | | |
|---|---|---|
| EP | 1 132 301 A2 | 9/2001 |
| FR | 2 682 082 A1 | 4/1993 |
| KR | 10-1135392 B | 4/2012 |
| WO | 99/41172 | 8/1999 |

OTHER PUBLICATIONS

Growcoon, "Growcoon @GreentechRAI 2016 in 3,5 minutes", https://www.youtube.com/watch?v=G CBBklwCdE, Jun. 23, 2016.

* cited by examiner

*Primary Examiner* — Gene O Crawford
*Assistant Examiner* — Kelvin L Randall, Jr.
(74) *Attorney, Agent, or Firm* — The Webb Law Firm (57) ABSTRACT

A method for providing nestable cones to a plant tray that includes recesses. For quickly and effectively carrying this out, use is made of a device, which comprises i) a head and ii) a support surface for a stack of cones, wherein a first wall section of a first cone is engaged by the head and the remainder of the stack of cones is stopped by means of a stack stop, after which the engaged cone is released.

15 Claims, 6 Drawing Sheets

METHOD OF PROVIDING A PLANT TRAY WITH NESTABLE CONES, AS WELL AS A DEVICE THEREFOR

The present invention relates to a method for providing nestable cones to a plant tray that includes recesses, which method comprises starting from a stack of nested cones, singling the nested cones, wherein the stack of nested cones has a first end and a second end, wherein the first end is the end where a relatively wide end of a first cone is situated, and the second end is the end where a relatively narrow end of a last cone is situated; and a wall section of the first cone is situated between an upper edge of the first cone and an upper edge of a second cone in which the first cone has been accommodated; and introducing the singled cones in the recesses of the plant tray.

In horticulture use is made of plant trays for allowing the plants to grow in an early stage of the plants. The plant tray comprises a plurality of recesses in which a substrate such as sand or compost is introduced, providing support and possibly also nutrition to the young plant. The plant may have come into being through a seed germinating in the recess of the plant tray, or it may have been introduced in the substrate during a different stage of development (for instance after tissue culture or by striking plant cuttings). The substrate provides the growing plant with support. When the young plant grows bigger, it needs to be repotted. A known problem is that the substrate, during repotting, is not fully removed from the recess, which is undesirable. A known solution is the use of a compost plug in which the compost has been shaped into one body by means of polyurethane foam. In view of the environment and expenses, this solution is dubious. Furthermore, it limits the gardener in his options to choose the composition of the substrate himself in order to achieve an optimal cultivation result. An alternative solution is the use of a gauze cone containing growth substrate such as compost. Such a gauze cone is commercially available under the name of Growcoon©. Because the cone is in the form of gauze, the cone is held by the roots. When removing the plant from the tray recess, all substrate is taken along. In case of the Growcoon® the gauze cone is biodegradable and it degrades to a large extent at a later stage.

A problem with nestable cones is that it is laborious, and as a result expensive, to introduce the nestable cones in the recesses of the plant tray.

It is an object of the present invention to provide a method to do this in an at least partially automated manner.

For that purpose, a method according to the preamble is characterized in that in the method use is made of a device, which device comprises a frame that has been provided with i) a head and ii) a support surface for the stack of cones; wherein the head and the support surface are mounted so as to be moveable relative to each other between i) a first position of the head, wherein the distance between the head and the support surface is relatively large and ii) a second position, wherein the said distance is relatively small, the device comprises a stop for the first cone of the stack when the head is in the second position, the head is configured for in the second position of the head engaging the wall section of the first cone, the device comprises a stack stop which is relatively movable with respect to the support surface for providing a first passage position, wherein the distance between the stack stop and the support surface is relatively large, and a second blocking position, wherein the distance between the stack stop and the support surface is relatively small, for blocking the second cone when carrying out a relative movement of the head and the support surface from the second position of the head to the first position;

wherein the method comprises the steps of carrying out a relative movement from the first position of the head to the second position, wherein in the said second position the first cone is situated against the stop, engaging the first wall section of the first cone by means of the head, which first cone is situated at the first end of the stack at a distance from the upper edge of the second cone in which the first cone has been accommodated, and carrying out a relative movement of the head as a result of which it is in a position different from the second position, in a condition wherein the stack stop is in its second position and acts as stop for the upper edge of the second cone, and the wall section of the first cone has been engaged by the head;

and in a relative position of the head that is different from the second position, the engaged first cone is released by the head to the recess of the plant tray.

In that way, a nestable cone can reliably and effectively be introduced into a recess of a plant tray. This is also the case with a gauze cone that is difficult to handle due to its slight weight and great flexibility.

A nestable cone as can be used in the method according to the invention, preferably also has a bottom. In case of a gauze cone it preferably has a gauze bottom, such as for instance the Growcoon® has.

Engaging the wall section of the first cone may for instance take place by using a needle, which is jabbed through the wall section of the first gauze cone without passing through the wall section of the second cone.

The relative movement can be effected in any manner, for instance by moving the head by means of a servo motor.

The stop advantageously is a stop for the upper edge (the relatively wide wall section) of the first cone.

The stack may have been placed on an inclined support surface, wherein the stack moves over the support surface under the influence of gravity. A support surface with a drive may also be chosen instead thereof.

The stack of nestable cones preferably is at an angle to the horizontal of at the most 30°, preferably an angle of less than 15°.

In that way, the nestable cones are not pushed into each other. The method according to the invention makes it possible to introduce the nestable cones in the desired vertical orientation into the plant tray in a simple manner indeed.

The stack stop is for instance configured like a brush (or even a rotating brush), with which the second cone can effectively be stopped while the first cone is firmly engaged to such an extent that it can be moved away from the stack stop.

Although the invention will be discussed on the basis of gauze cones, the invention is not limited to such cones and the term nestable cones also comprises nestable plant pots, for instance made of plastic or a biodegradable material. The cross-section of the nestable cones may have any shape, but will in actual practice usually be circular or polygonal, such as preferably square, either with or without rounded off corners.

An advantageous embodiment is characterized in that the nestable cones are nestable gauze cones.

This is an important field of application of the method according to the invention.

An advantageous embodiment is characterized in that the head comprises a projecting part, which projecting part is introduced in the first cone of the stack of nestable cones and provides the stop for the first cone of the stack of nestable cones.

This contributes to effectively engaging the first cone.

An advantageous embodiment is characterized in that after the first cone has contacted the stop, the wall section of the first cone is situated between a clamping section of a clamp of the head in a first, open position, after which the clamp is brought in a second, closed position, wherein the clamping section presses the wall section of the first cone against the projection.

In that way, the wall section of the first cone can easily and effectively be engaged.

An advantageous embodiment is characterized in that the first cone is engaged by means of at least two clamps distributed over the circumference of the first cone.

In that way, it is prevented that the first cone is warped when it is taken from the stack. The number of clamps advantageously is two, at two sections of the first cone that are situated opposite each other.

An advantageous embodiment is characterized in that the support surface comprises rollers and the stack of cones is transported in the direction of the head by means of rollers extending transverse to the longitudinal direction of the stack.

Rollers make it possible to have little friction between the stack of cones and the rollers, also due to the small contact surface. There is no problem whatsoever when the first cone comes into contact with the stop. The rollers will for instance be metal or plastic (such as PVC) rollers. Advantageously at least one roller is a driven roller.

An advantageous embodiment is characterized in that the first cone is provided with substrate after singling.

Preferably, this takes place when the cone has been introduced in the recess. The substrate is a granular substrate, for instance a granular substrate comprising at least one material selected from sand and compost.

An advantageous embodiment is characterized in that the first cone is deposited in the recess via a chute placed at an angle.

The chute straightforward effectively and passively ensures the adjustment of the orientation of the first cone released by the head, as well as the guiding and positioning relative to the recess of the plant tray.

An advantageous embodiment is characterized in that the method, once the wall section has been engaged using the head and prior to carrying out the relative movement of the head to a position different from the second position, the method comprises the step of reducing the distance from a part of the wall section of the first cone to the center line of the stack of nestable cones relative to the distance from the upper edge of the second cone to the said center line.

In such a case, the stop may for instance simply be a metal strip.

Finally, the present invention relates to a device for carrying out an operation with respect to a plant tray, wherein the device is a device for providing nestable cones to the plant tray that includes recesses, which device is suitable for  starting from a stack of nested cones, singling the nested cones, wherein the stack of nestable cones has a first end and a second end, wherein  the first end is the end where a relatively wide end of a first cone is situated, and  the second end is the end where a relatively narrow end of a last cone is situated; and  introducing the singled cones in the recesses of the plant tray;

wherein the device comprises a frame that has been provided with
  i) a head and ii) a support surface for the stack of cones; wherein the head and the support surface are mounted so as to be moveable relative to each other between a first position, wherein the distance between the head and the support surface is relatively large, and a second position, wherein the said distance is relatively small,  the device comprises a stop for the first cone of the stack,  the head is configured for in the second position of the head engaging a wall section of the first cone,  the device comprises a stack stop which is relatively movable with respect to the support surface for providing  a first passage position, wherein the distance between the stack stop and the support surface is relatively large, and  a second blocking position, wherein the distance between the stack stop and the support surface is relatively small, for blocking the second cone when carrying out a relative movement of the head and the support surface from the second position of the head to the first position.

Such a device is highly suitable to be used in the method according to the invention.

The device preferably comprises a series of heads placed in parallel, which have been connected to each other and can be moved as one unity relative to the support surface. In that way, many first cones can be taken off of the stack and be discharged to a plant tray. This increases the speed at which a plant tray can be provided with cones.

An advantageous embodiment is characterized in that the device comprises a chute into which a first cone that has been removed from the stack is discharged by the head in the first position.

The chute straightforward effectively and passively ensures guidance and positioning.

An advantageous embodiment is characterized in that the device has been provided with a light sensor for detecting the passage of the first cone discharged to the chute by the head.

The line between the light source, which may be configured like a hole in the chute that allows light to pass through, and the light sensor, preferably is at an angle of between 0.5° and 10°, preferably of between 1° and 5°, to a plane transverse to the center line through the chute. This is assumed to increase and/or facilitate the reliability of detecting a cone having a bottom. The chute preferably is not transparent, for instance made of metal and advantageously of dark synthetic material, as a result of which the light sensor is to some degree protected against ambient light, which facilitates the detection.

An advantageous embodiment is characterized in that the support surface comprises a plurality of rollers.

Rollers make it possible to have little friction between the stack of cones and the rollers, also due to the small contact surface. In that way, the stack is not pressed together in an unwanted manner, which would make singling more difficult or even impossible, not even if the first cone contacts the stop. The rollers will for instance be metal or plastic (such as PVC) rollers. Preferably, at least one roller is a driven roller.

An advantageous embodiment is characterized in that the head comprises a protruding part, which protruding part provides the stop for the first cone of the stack of nestable cones, wherein the head comprises a clamp having a clamping section, wherein the clamping section may be situated in a first, open position for accommodating the first cone of the stack between the clamping section and the protrusion, and in a second, closed position the clamping section is able to press the edge of the first cone against the protrusion.

In that way, the first cone can be effectively engaged. Advantageously the head comprises two clamps for engaging the first cone of the stack at opposite sides. The protruding part preferably is a tapering protrusion which over a part of its surface extends parallel to the first cone to be removed.

The present invention will now be elucidated on the basis of the drawing, in which

Figure 1A:
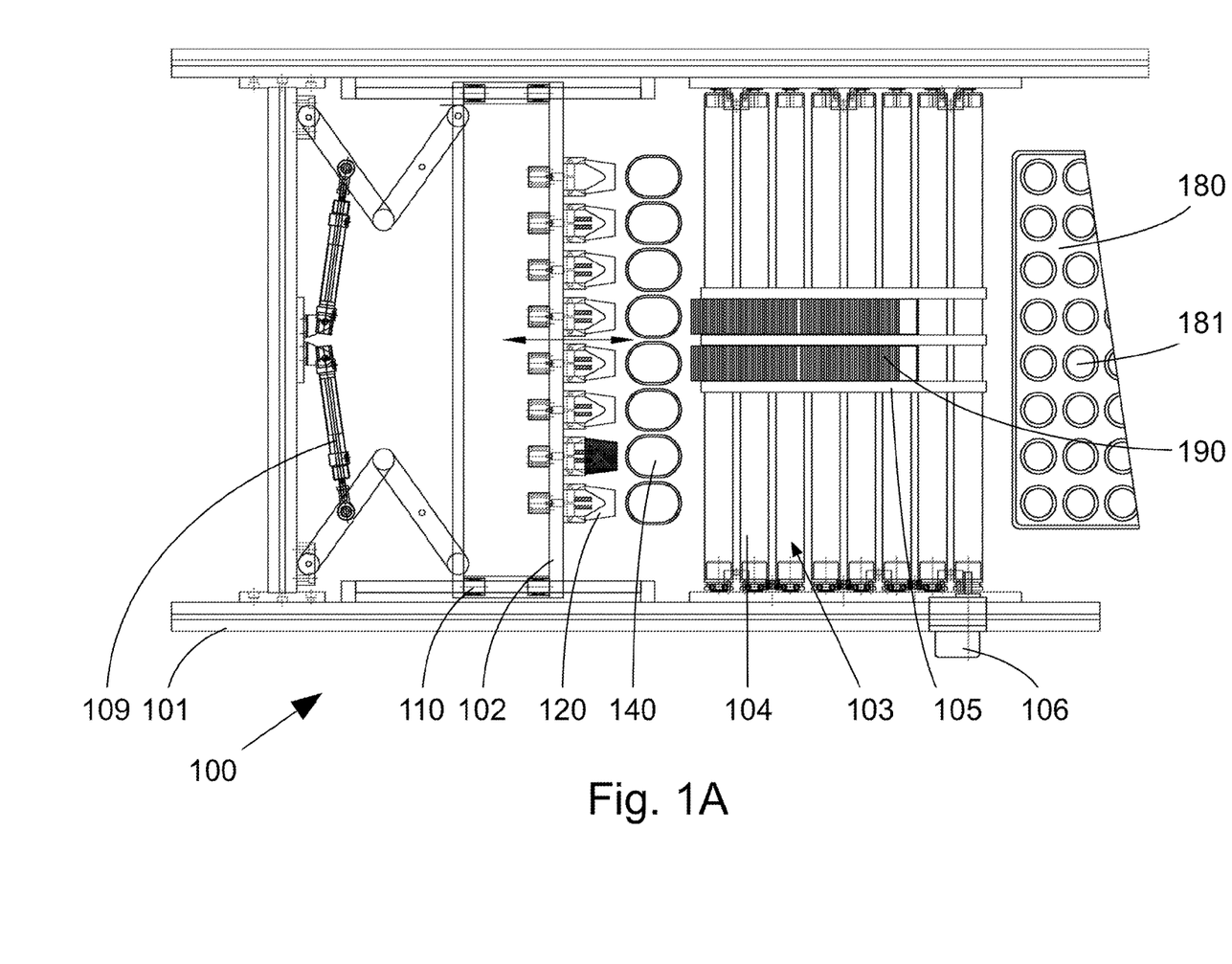
FIG. 1A to FIG. 1C show a top view, a side view and a rear view of a device according to the invention.
Figure 1B:
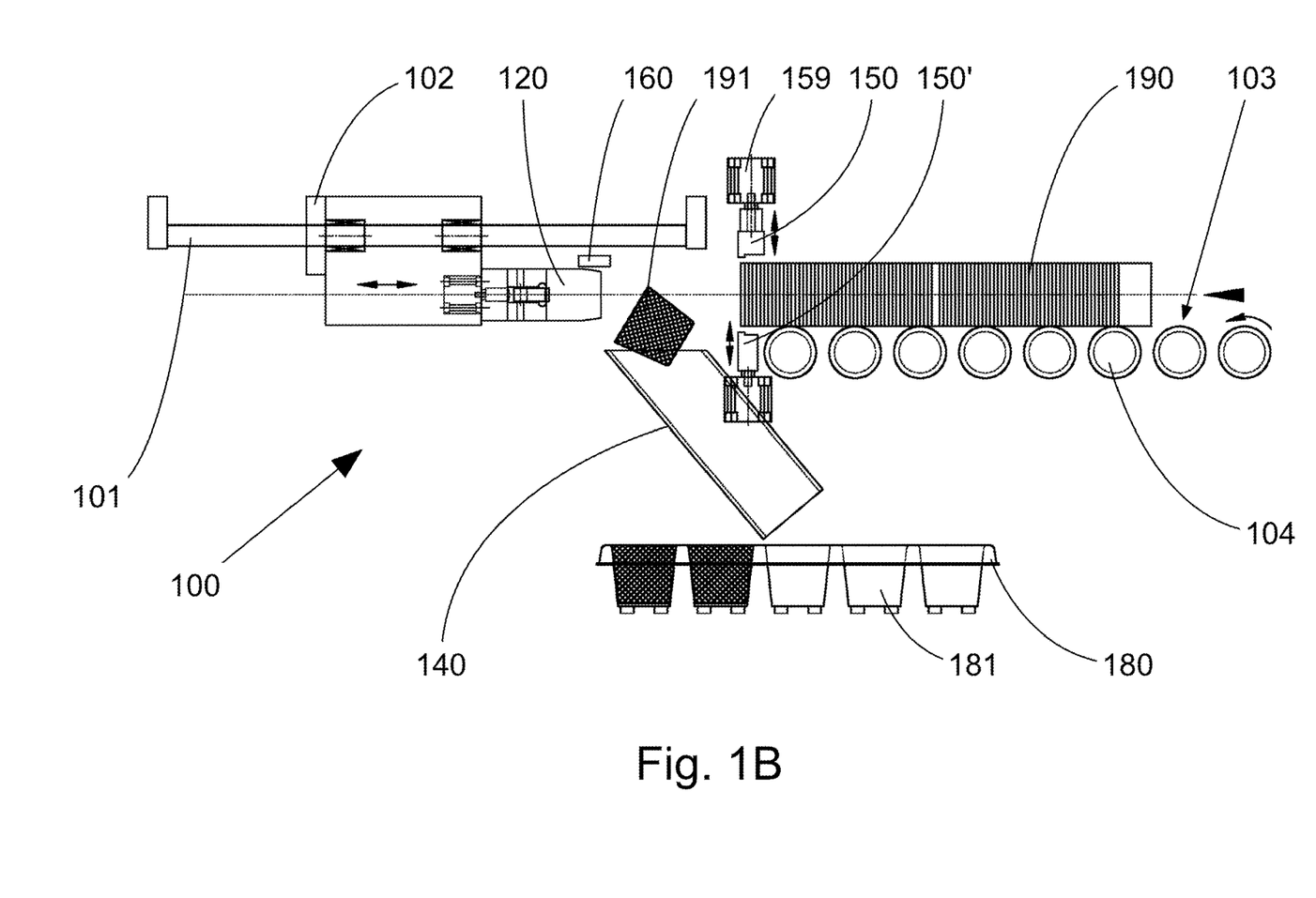
Figure 1C:
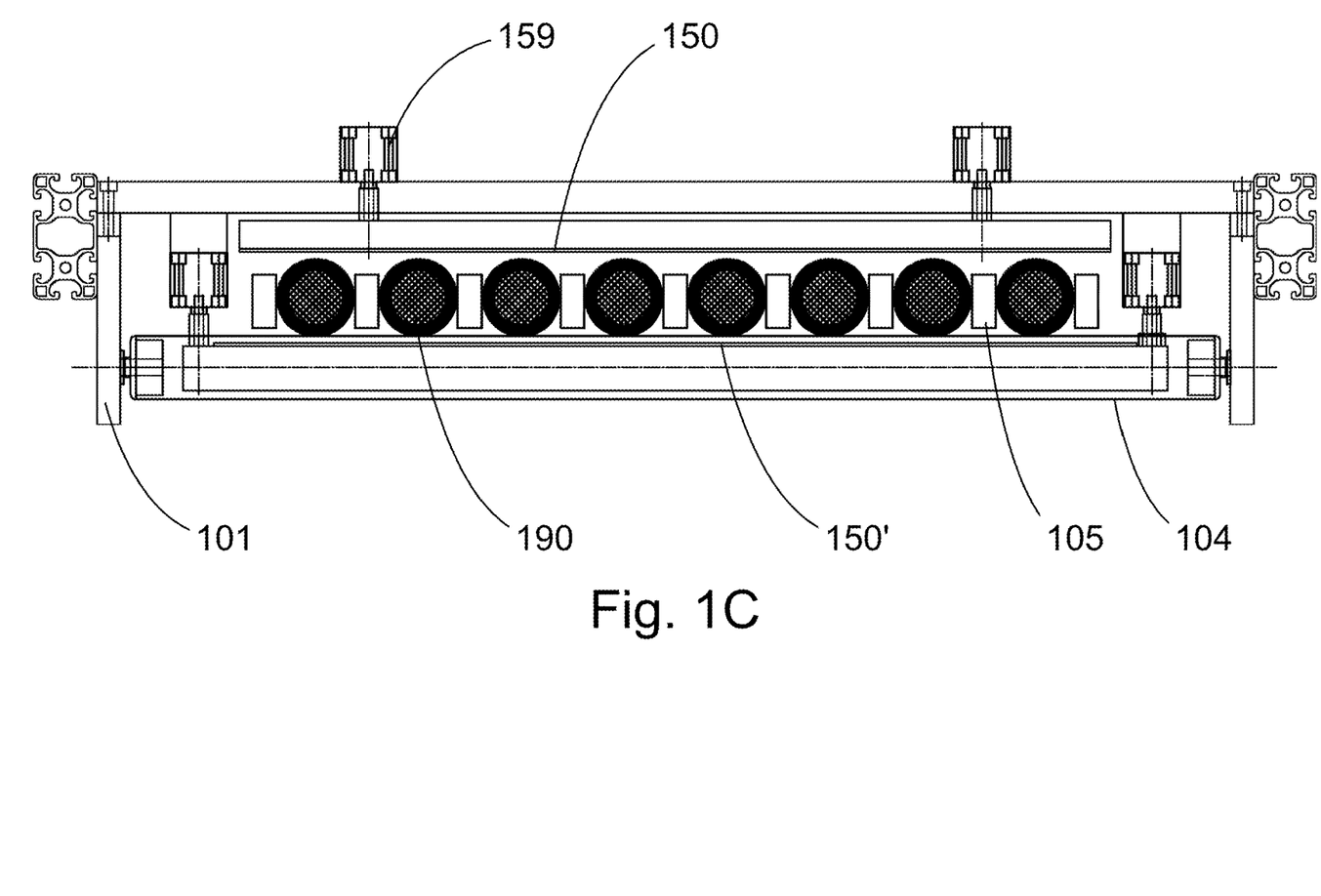

FIG. 1A to FIG. 1C show a top view, a side view and a rear view of a device 100 according to the invention.

The device 100 comprises a frame 101 provided with a movable sub-frame 102 that is movable relative to a support surface 103 provided by rollers 104. Above the rollers 104 the frame 101 has been provided with partitions 105 that function as guidance for a stack 190 of nested cones 191 (FIG. 1B) of which only two are shown in FIG. 1A. The rollers 104 are rollers 104 driven by a motor 106. The rollers 104 are smooth as a result of which the stack 190 may indeed be transported but in case the stack 190 is stopped, the rollers 104 can continue to rotate without problems in front of the stack 190. FIG. 1A shows a plant tray 180 having recesses 181, which recesses 181 have to be provided with gauze cones.

The movable sub-frame 102 has been connected to the frame 101 by means of two scissoring arms, wherein pneumatic cylinders 109 have been provided for providing a linear motion of the movable sub-frame 104 transverse to the rollers 104 and parallel to the support surface 103. In the embodiment shown, the sub-frame 102 has been provided with four wheels 110 or linear bearings with which the sub-frame 102 moves over the frame 101.

The movable sub-frame 102 has been provided with a series of heads 120, the operation of which will be explained in detail below. The function of the heads 120 is removing a gauze cone 191 from the stack 190 and depositing it in a chute 140, via which the cone 191 ends up in a recess 181 of the plant tray.

The device 100 works as follows. The sub-frame 102 including the heads 120 is passed from a first position of the heads to the stacks 190 of gauze cones that lie horizontally.

The heads 120 are configured conically and in a second position extend in the gauze cones and provide a stop for them. Because the stacks 190 are capable of sliding over the support surface despite the rotating rollers 104, the position of the first cone situated closest to the heads is thus defined in the second position of the heads.

A stack stop 150 (FIG. 1B; left out in FIG. 1A) is moved towards the heads 120, such that the first cones are pressed in and the abutting second cones are not. Then the first cones, after having been engaged by the heads 120, are transported away from the support surface 103 by moving the sub-frame 102, whereas the stacks 190 of gauze cones are stopped by the stack stop 150.

The first cones 191 that are situated on the heads 120 are released and by means of a discharge stop 160 of the heads 120 are removed at the location of the chutes 140 as a result of which they fall in the chutes 140 and end up in the recesses 181 of the plant tray 180.

The stack stop 150 may very simply be configured like a strip which, by means of two pneumatic cylinders 159, can be moved between a position that is situated far removed from the support surface 103 (shown in FIG. 1C) and a position that is situated relatively close to the support surface 103.

In the embodiment shown in FIG. 1B, a second stack stop 150' has been provided below the support surface 103.

FIG. 2A to FIG. 2E illustrate an embodiment of the method according to the invention by means of top views of a head 120 for engaging a gauze cone 191 from a stack 190 of gauze cones.

A part of the sub-frame 102 provided with a head 120 can be seen. The head 120 comprises two clamps 221, which are rotatable about an axis 222. Lever arms 223 are pressed in by means of an actuator 230, such as by means of the piston of a pneumatic cylinder, as a result of which the clamps 221 reach an opened position (FIG. 2A) and springs 224 providing a counter force are pressed in. In this embodiment, the clamps 221 therefore have to be closed actively and opened passively.

Figure 2A:
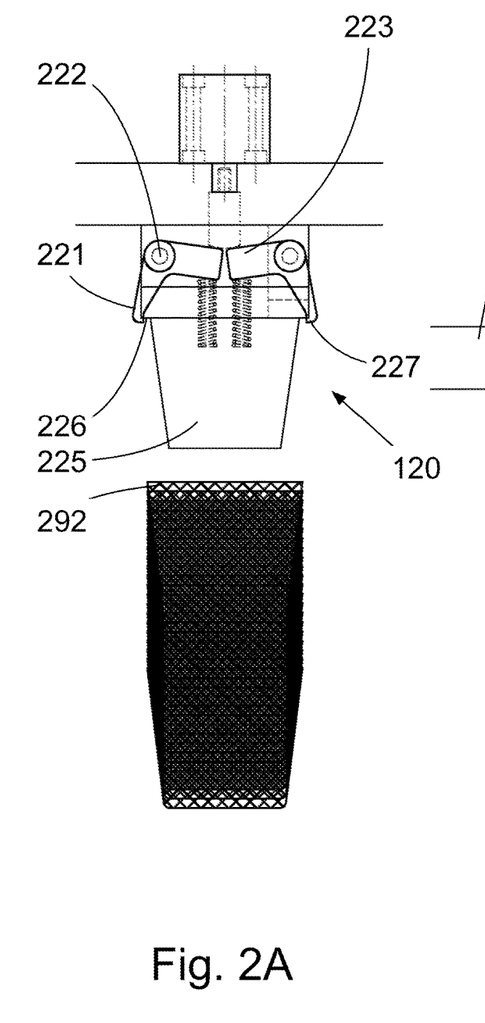
FIG. 2A to FIG. 2E illustrate an embodiment of the method according to the invention by means of top views of a head for engaging a gauze cone from a stack of nestable cones.

In the embodiment shown, the head 120 comprises a cone-shaped protrusion 225 that will be introduced into a gauze cone 191. The head 120 comprises a stop 226 surrounding the protrusion 225, for the upper edge of the cone 191 of the stack 190 of gauze cones into which the protrusion 225 is introduced.

Figure 2B:
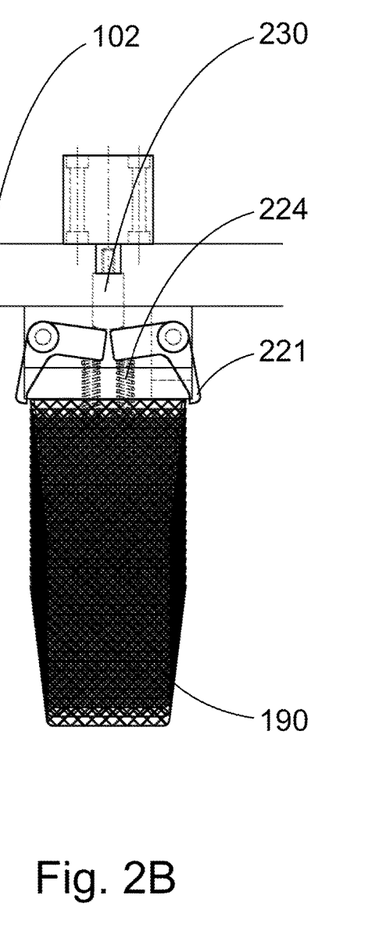

Due to the sub-frame 102 moving from the first position to the second position, the protrusion 225 is inserted into the first cone 191 of the stack 190 of cones (FIG. 1B). Optionally the head 120 pushes the stack 190 of gauze cones in a direction opposite the conveyance direction as defined by the rollers 104.

Figure 2C:
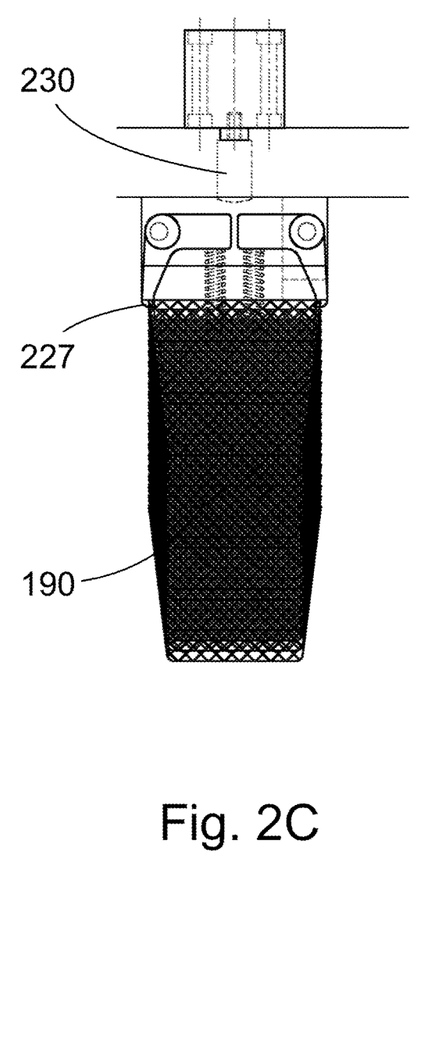

The actuator 230 is pulled back as a result of which the springs 224 push the lever arms 223 away and the clamps 221 with their free ends 227 engage onto the wall section 292 of just the first cone 191 of the stack 190.

Figure 2D:
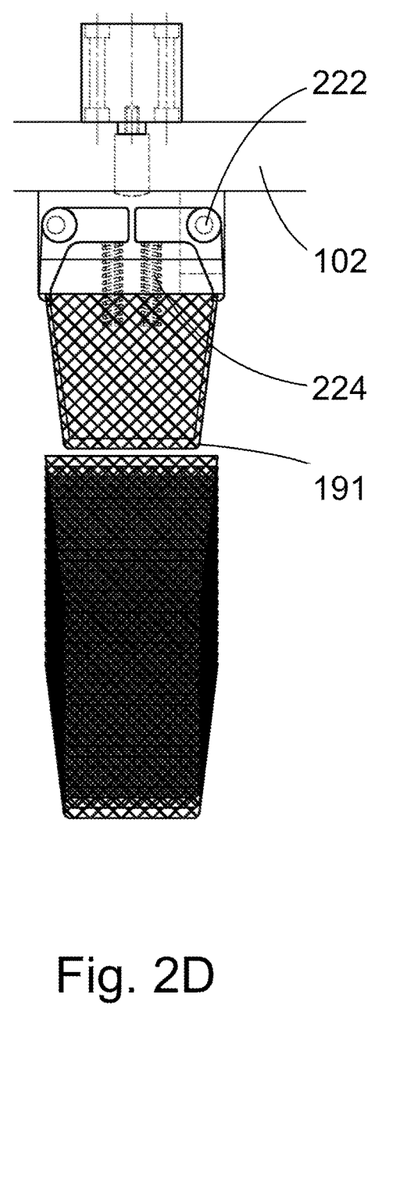

Subsequently or simultaneously the stack stop 150 is moved in the direction of the center line through the stack 190 of gauze cones, as a result of which it is able to block the cone of the stack 190 adjacent to the first cone 191. This may involve pressing in the wall section of the first cone 191 in case the protrusion 225 is flattened, as a result of which the stack stop 150 is able to function as stop for the upper edge of the second cone of the stack 190.

Figure 2E:
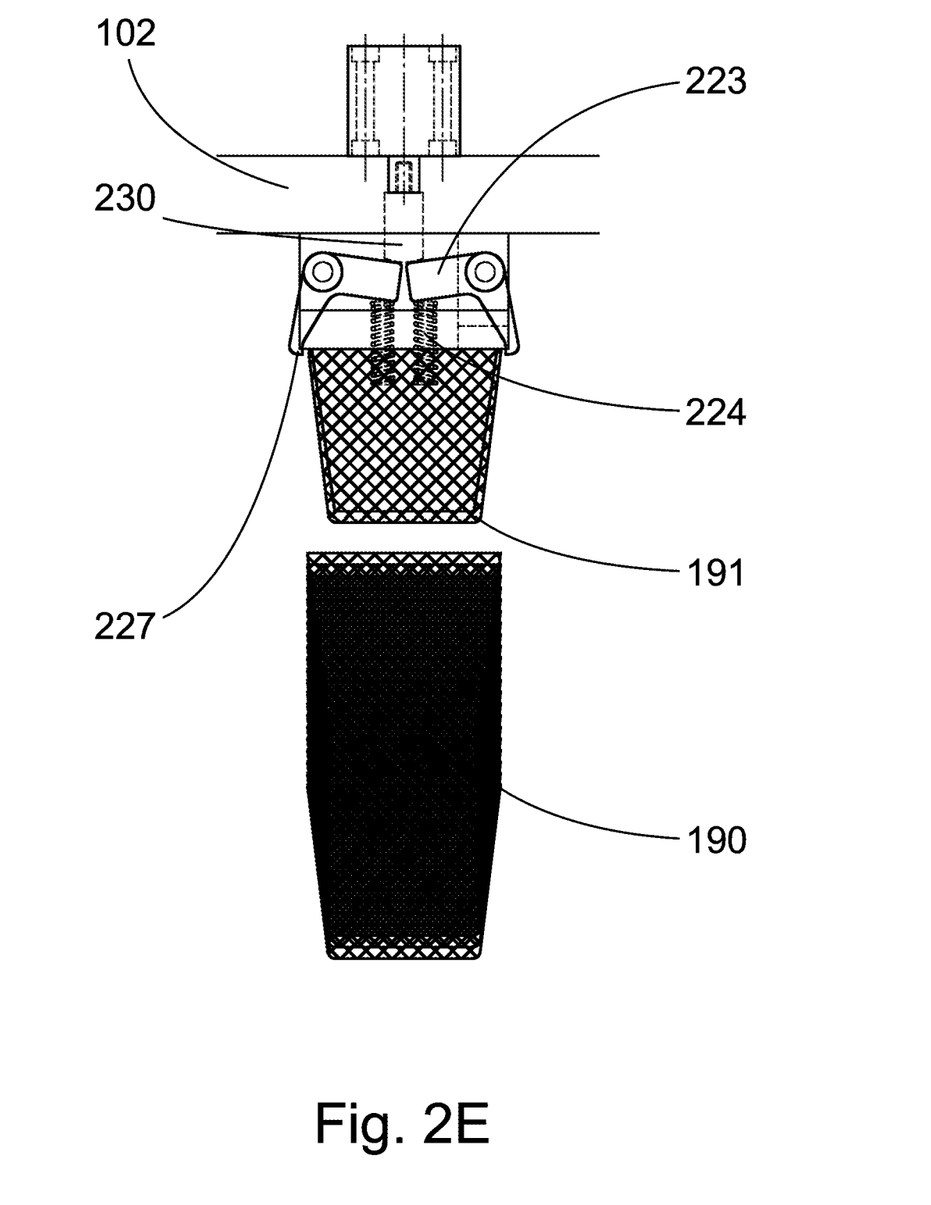

In a condition in which the second cone of the stack 190 is stopped by the stack stop 150, the sub-frame 102 and therefore the head 120 is transported away from the support surface 103 while taking along the first cone 191 retained by the clamps 221.

For discharging the first cone 191 retained by the head 120, the actuator 230 is activated as a result of which the clamps 221 end up in the opened position. By moving the sub-frame 102 with the heads 120 past the discharge stop 160, the first cone 191 that is no longer retained is slid from the protrusion 225 above the chute 140 by the discharge stop 160, as a result of which the first cone 191 falls into the chute 140 and, guided by it, ends up in the corresponding recess 181 of the plant tray 180. The latter is slightly moved, as a result of which a new row of recesses to be provided with a gauze cone arrive below the exit openings of the chutes 140.

It will be clear that the device 100 according to the invention makes it possible to easily introduce gauze cones in the recesses, wherein the change of orientation of the gauze cones is achieved passively (due to gravity) and merely one linear translation (or one path defined by a rotation, in particular along a segment of a circular path) will suffice for the heads 120.

The actuator 230 is able to operate two lever arms and therefore two clamps simultaneously. If so desired, the actuator 230 may, for that purpose, comprises a push rod with a distal thickening.

The invention claimed is:

1. A method for providing nestable cones to a plant tray that includes recesses, wherein said method comprises:
   starting from a stack of nested cones, singling the nested cones, wherein the stack of nested cones has a first end and a second end, wherein
      the first end is an end where a relatively wide end of a first cone is situated, and
      the second end is an end where a relatively narrow end of a last cone is situated; and
      a wall section of a first cone is situated between an upper edge of the first cone and an upper edge of a second cone in which the first cone has been accommodated; and
   introducing the singled nested cones in the recesses of the plant tray;
      wherein in the method use is made of a device, which device comprises a frame that has been provided with i) a head for securing thereto and releasing therefrom a cone and ii) a support surface for the stack of cones; wherein
      the head and the support surface are mounted so as to be moveable relative to each other between i) a first position of the head, wherein the distance between the head and the support surface is relatively large and ii) a second position, wherein the said distance is relatively small,
      the device comprises a stop for the first cone of the stack when the head is in the second position,
      the head is configured for in the second position of the head engaging the wall section of the first cone to remove the first cone from the stack,
      the device comprises a stack stop which is relatively movable with respect to the support surface for providing
         a first passage position, wherein the distance between the stack stop and the support surface is relatively large, and
         a second blocking position, wherein the distance between the stack stop and the support surface is relatively small, for blocking the second cone when carrying out a relative movement of the head and the support surface from the second position of the head to the first position;
      wherein the method comprises the steps of:
         carrying out a relative movement from the first position of the head to the second position, wherein in the said second position the first cone is situated against the stop,
         engaging the first wall section of the first cone by means of the head, which first cone is situated at the first end of the stack at a distance from the upper edge of the second cone in which the first cone has been accommodated, and
         carrying out a relative movement of the head to remove the first cone from the stack as a result of which it is in a position different from the second position, in a condition wherein
         the stack stop is in its second position and acts as stop for the upper edge of the second cone, and
         the wall section of the first cone has been engaged by the head such that the head may move away from the stack and displace the first cone from the stack; and
         in a relative position of the head that is different from the second position, the engaged first cone is released from the head and deposited within the recess of the plant tray.

2. The method according to claim 1, wherein the nestable cones are nestable gauze cones.

3. The method according to claim 1, wherein the head comprises a projecting part, which projecting part is introduced in the first cone of the stack of nestable cones and provides the stop for the first cone of the stack of nestable cones.

4. The method according to claim 3, wherein after the first cone has contacted the stop, the wall section of the first cone is situated between a clamping section of a clamp of the head in a first, open position, after which the clamp is brought in a second, closed position, wherein the clamping section presses the wall section of the first cone against the projection.

5. The method according to claim 1, wherein the first cone is engaged by means of at least two clamps distributed over the circumference of the first cone.

6. The method according claim 1, wherein the support surface comprises rollers and the stack of cones is transported in the direction of the head by means of rollers extending transverse to the longitudinal direction of the stack.

7. The method according to claim 1, wherein the first cone is provided with substrate after singling.

8. The method according to claim 1, wherein the first cone is deposited in the recess via a chute placed at an angle.

9. The method according to claim 1, wherein the method, once the wall section has been engaged using the head and prior to carrying out the relative movement of the head to a position different from the second position, the method comprises the step of reducing the distance from a part of the wall section of the first cone to the center line of the stack of nestable cones relative to the distance from the upper edge of the second cone to the said center line.

10. The method according to claim 1, wherein the cone is released by the head to the recess of the plant tray via a chute.

11. A method for providing nestable cones to a plant tray that includes recesses, wherein said method comprises:
   starting from a stack of nested cones, singling the nested cones, wherein the stack of nested cones has a first end and a second end, wherein the first end is an end where a relatively wide end of a first cone is situated, and the second end is an end where a relatively narrow end of a last cone is situated; and each cone has a wall section situated between its relatively wide end and its relatively narrow end; and introducing the singled nested cones in the recesses of the plant tray;

wherein in the method use is made of a device, which device comprises a frame that has been provided with i) a head for securing thereto and releasing therefrom a cone and ii) a support surface for the stack of cones; wherein the head and the support surface are mounted so as to be moveable relative to each other between i) a first position, wherein the distance between the head and the support surface is relatively large and ii) a second position, wherein the said distance is relatively small, the device comprises a stop for the first cone of the stack, the head is configured for in the second position engaging the wall section of the first cone to remove the first cone from the stack, the device comprises a stack stop which is relatively movable with respect to the support surf ace for providing a first passage position, wherein the distance between the stack stop and the support surface is relatively large, and a second blocking position, wherein the distance between the stack stop and the support surface is relatively small, for blocking the second cone when carrying out a relative movement of the head and the support surface from the second position to the first position;

wherein the method comprises the steps of:

carrying out a relative movement from the first position to the second position to remove the first cone from the stack, wherein in the said second position the first cone is situated against the stop, engaging the first wall section of the first cone by means of the head, which first cone is situated at the first end of the stack at a distance from the upper edge of the second cone in which the first cone has been accommodated, and carrying out a second relative movement, in a condition wherein the stack stop is in its second blocking position and acts as stop for the upper edge of the second cone, and the wall section of the first cone has been engaged by the head such that the head may move away from the stack and displace the first cone from the stack; and in a relative position that is different from the second position, the engaged first cone is released from the head and deposited within the recess of the plant tray.

12. The method according to claim 11, wherein the device comprises a chute, wherein the method comprises discharging a first cone that has been removed from the stack into the chute by the head in the first position.

13. The method according to claim 11, wherein the device has been provided with a light sensor, wherein the method comprises using the light sensor for detecting the passage of the first cone discharged by the head.

14. The method according to claim 11, wherein the support surface comprises a plurality of rollers.

15. The method according to claim 11, wherein the head comprises a protruding part, which protruding part provides the stop for the first cone of the stack of nestable cones, wherein the head comprises a clamp having a clamping section, wherein the method comprises situating the clamping section in a first, open position for accommodating the first cone of the stack between the clamping section and the protrusion, and situating the clamping section in a second, closed position wherein the clamping section presses an edge of the first cone against the protrusion.

\* \* \* \* \*